United States Patent

Chounan

[11] Patent Number: 5,606,673
[45] Date of Patent: Feb. 25, 1997

[54] SMALL COMPUTER SYSTEM INTERFACE (SCSI) CONTROLLER

[75] Inventor: Tamotsu Chounan, Tokyo, Japan

[73] Assignee: NEC Corporation, Japan

[21] Appl. No.: 19,608

[22] Filed: Feb. 19, 1993

[30]  Foreign Application Priority Data

Feb. 19, 1992 [JP] Japan .................................. 4-031188

[51] Int. Cl.⁶ ........................................................ G06F 13/14
[52] U.S. Cl. ......................... 395/309; 395/285; 395/853
[58] Field of Search .................................. 395/325, 275, 395/425, 285, 550, 290, 309, 853

[56]  References Cited

U.S. PATENT DOCUMENTS

| | | | |
|---|---|---|---|
| 5,233,692 | 8/1993 | Gajjar et al. ............................. | 395/309 |
| 5,241,630 | 8/1993 | Lattin, Jr. et al. ...................... | 395/287 |
| 5,247,622 | 9/1993 | Choi ........................................ | 395/294 |
| 5,313,588 | 5/1994 | Nagashige et al. ..................... | 395/825 |
| 5,371,861 | 12/1994 | Keener et al. .......................... | 395/309 |
| 5,454,083 | 9/1995 | Choi ........................................ | 395/285 |

OTHER PUBLICATIONS

ANSI X3.136 Small Computer System Interface, pp. 22–61.
ANSI X3T9.2/86–109 Revision 10c. Small Computer System Interface—2.
ANSI X3.131 199x—Sep. 2, 1991, Proposed Draft, Small Computer System Interface.

*Primary Examiner*—Glenn A. Auve
*Attorney, Agent, or Firm*—Ostrolenk, Faber, Gerb & Soffen, LLP

[57]  ABSTRACT

Where a command having a selection waiting phase unifies standard operations to take place in different SCSI phases, if an SCSI controller is selected before the command is issued, the command issued will be disregarded. The problem of the command being disregarded is solved by the provision of a circuit which responds only when the command of performing select wait is issued. The circuit detects the issuance of the command of performing select wait to the SCSI controller and outputs an detection signal indicative of such fact. The SCSI controller is adapted to respond only when the detection signal is active. Since the command of performing select wait can be used regardless of its issuing timing, the overhead time can be reduced greatly as compared with the arrangement where a command of performing processing is used in each phase.

6 Claims, 3 Drawing Sheets

SMALL COMPUTER SYSTEM INTERFACE (SCSI) CONTROLLER

BACKGROUND OF THE INVENTION

(1) Field of the Invention

The present invention relates to a controller for a Small Computer System Interface (hereinafter referred to as an "SCSI") which is a general purpose input/output interface for a medium and small scale computer system standardized by ANSI (American National Standard Institute) as X3.131-1986 and X3T9.2/86-109 Revision 10c, and more particularly to an SCSI controller having a command which unifies standard operations to take place in different phases.

(2) Description of the Related Art

An internal construction of a conventional SCSI controller for performing the operations of arbitration and selection is shown in FIG. 1. Up to eight SCSI devices can be daisy chained on an SCSI bus, and an ID (identifier) from "0" to "7" is assigned for each SCSI device.

In FIG. 1, reference numeral 101 denotes a host system interface; 102 a main sequence controller; 103 an SCSI bus phase register; 104 an arbitration/selection controller; 105 an SCSI bus phase controller, and 106 an SCSI bus interface.

As shown in FIG. 1, the host system interface 101 controls access to internal registers incorporated in the main sequence controller 102. The internal register includes a controller status register for indicating the operation status of the SCSI controller and an interrupt status register for storing the information as to the cause of interruption when a host CPU is interrupted with an interrupt signal (INT) 110 issued from the host system interface 101.

A signal for permitting the SCSI controller to respond as a target during the selection operation is connected to the arbitration/selection controller 104 from the main sequence controller 102 which controls the entire SCSI controller. The arbitration/selection controller 104 makes a decision as to winning or losing in arbitration, and monitors ID on the SCSI data bus when the initiator has selected the SCSI controller as the target. When the ID at issue agrees with its own ID, if the select enabling signal (SENA) outputted from the main sequence controller 102 is high, the arbitration/selection controller 104 asserts the busy signal (BSY) through the SCSI bus interface 106 so that the SCSI controller responds as a target.

Particularly, the SCSI interface protocol is given in "ANSI X3.131-1986 Small Computer System Interface" and "ANSI X3T9.2/86-109 Revision 10c, Small Computer System Interface - 2".

When the SCSI controller has become the target, the arbitration/selection controller 104 causes the SCSI bus phase controller 105 to determine the SCSI bus phase and controls a message signal (MSG), a control/data signal (C/D) and an input/output signal (I/O) through the SCSI bus interface 106 to determine the SCSI bus phase on the SCSI control bus. The phrase register 103 is only used to store the SCSI bus phase in the main sequence controller 102.

The above prior art has the following problem to be solved. Where the initiator has selected an SCSI controller as a target, if the host CPU issues an auto-target-command for the SCSI controller which has already become the target, the SCSI controller, which has already been selected, cannot be selected by the auto-target-command. Thus, the auto-target-command will be disposed of as an invalid command. The command performing "select wait" such as the auto-target-command is therefore bound by the condition that it must be issued before the initiator makes the selection. But, it is difficult to ensure that the auto-target-command be issued always before the initiator actually makes the selection.

Where an arrangement is such that a mode register provided within the SCSI controller initially makes the setting as to whether or not the SCSI controller should respond to selection/reselection, it is required that, before the "select wait" is performed while the auto-target-command is being processed, the contents of the register be changed from the non-responding mode to the responding mode. However, the prior art SCSI controller is not permitted to perform a write operation for the mode register while it processes the command.

For this reason, the auto-target-command which includes the phase for the "select wait" must always be issued before the initiator makes the selection, which means that the target must know in advance the operation of the initiator. This requires a command to be used exclusively to perform only the processing for each phase. This gives rise to a problem that, with a standard sequence, there will be a large overhead. Specifically, where the target is a magnetic disk drive using a floppy disk as a recording media, the processing when a read command is issued is as follows.

The commands to be issued for the target are a send command sending an identify message, a receive command receiving a read command, a send command sending a data on the magnetic disk, a send command sending a status byte and a send command sending a command complete message. In order to issue these commands, the controller status register in which the operation of the SCSI controller is written as it takes place must be read to confirm that the controller is not operating. Further, when the operation is completed, an interruption occurs in the host CPU so that the host CPU reads the interrupt status to confirm what the cause of interruption is.

Thus, the above five commands must be issued for the SCSI controller which is the target. Further, in order to read the controller status and the interrupt status each time the command is issued, at least 20 times of I/O access are required. Assuming that, in a system composed of a CPU having a minimum instruction cycle of 200 ns and an SCSI controller supporting the high speed synchronous transfer rate of 10 MB/s, read for I/O access includes 14 cycles and write therefor includes 10 cycles, three times of I/O read and one time of the I/0 write are required so that the overhead time $T_o$ due to the I/O access only can be represented by:

$$T_o = (15 \text{ times} \times 14 + 5 \text{ times} \times 10) \times 200 \text{ ns} = 52.0 \text{ } \mu s.$$

In the high speed synchronous transfer rate of 10 MB/s, the time taken for one sector to transfer the 1024 byte data of the magnetic disk (e.g., a floppy disk) to the initiator is 124.0 µs, so that the overhead time due to the I/O access only occupies 40% or more of the transfer time. Thus, If the auto-target-command cannot be used, the processing capability will deteriorate greatly. This is a problem to be solved by the invention, in the conventional SCSI controllers.

SUMMARY OF THE INVENTION

It is, therefore, an object of the present invention to provide an SCSI controller with the overhead time being greatly reduced.

In order to attain the above object, in accordance with the present invention, there is provided an SCSI controller adapted to perform an auto-target-command unifying standard operations in a selection phase which is an SCSI bus phase when a target defined by an SCSI protocol, capable of responding to a request of performing an operation, is selected and in each of further SCSI bus phases, the SCSI controller comprising:

a phase register means which automatically stores each SCSI bus phase determined by a status of an SCSI control bus;

a decoder means which, after the auto-target-command is issued to the SCSI controller to be selected as a target, decodes the phase stored by the phase register means to detect a selection waiting phase and outputs a detection signal;

an arbitration/selection control means which controls function of asserting a BSY signal for responding to a selection of the SCSI controller as a target; and a signal control means which causes the BSY signal to be asserted only when the selection phase is detected as the detection signal after the issuance of the auto-target-command under the state where an initiator defined by the SCSI protocol, capable of initiating the operation, intends to select the SCSI controller as a target.

BRIEF DESCRIPTION OF THE DRAWINGS

The above and other objects, features and advantages of the present invention will be apparent from the following description of preferred embodiments of the invention explained with reference to the accompanying drawings, in which.

DESCRIPTION OF THE PREFERRED EMBODIMENTS

Figure 1:
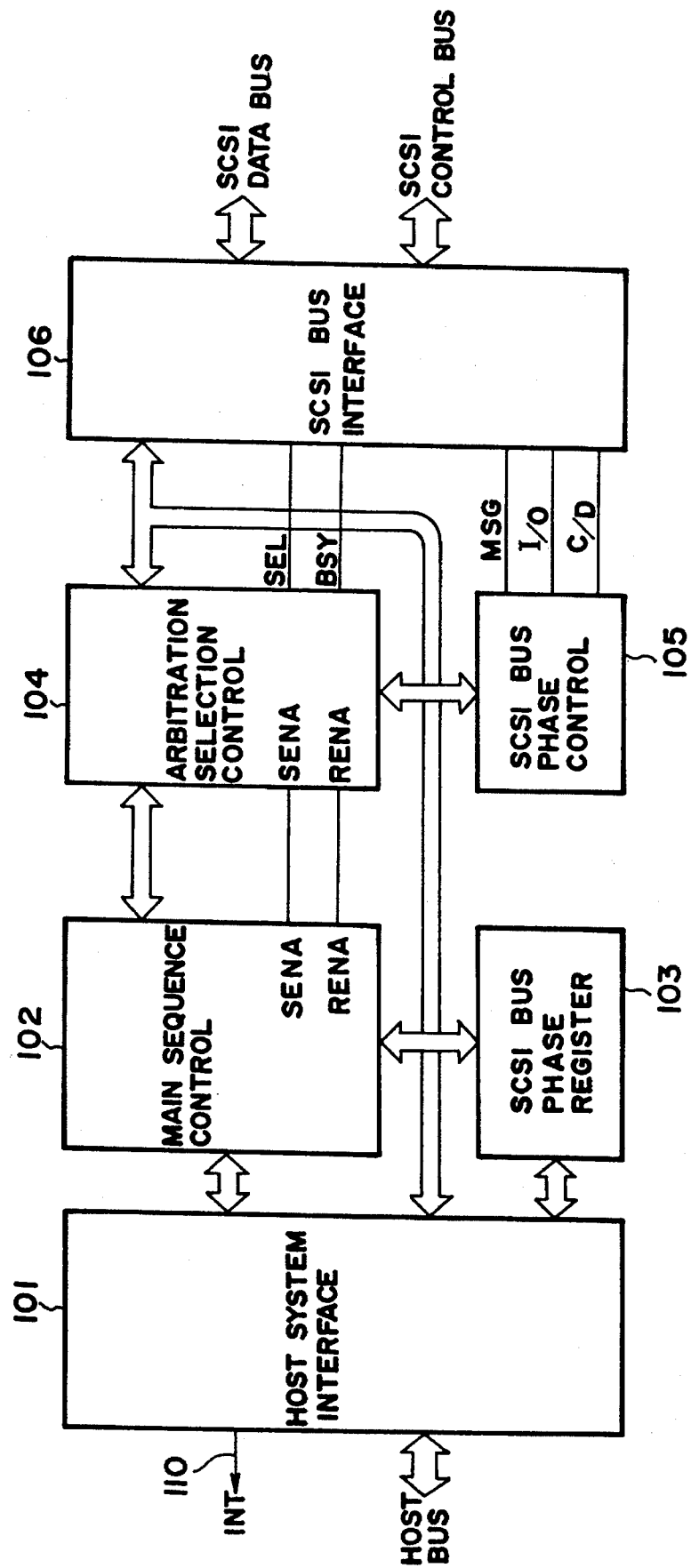
FIG. 1 is a block diagram of a typical example of the conventional SCSI controller.

Now, referring to the drawings, an explanation will be given of the invention in connection with its embodiments.

Figure 2:
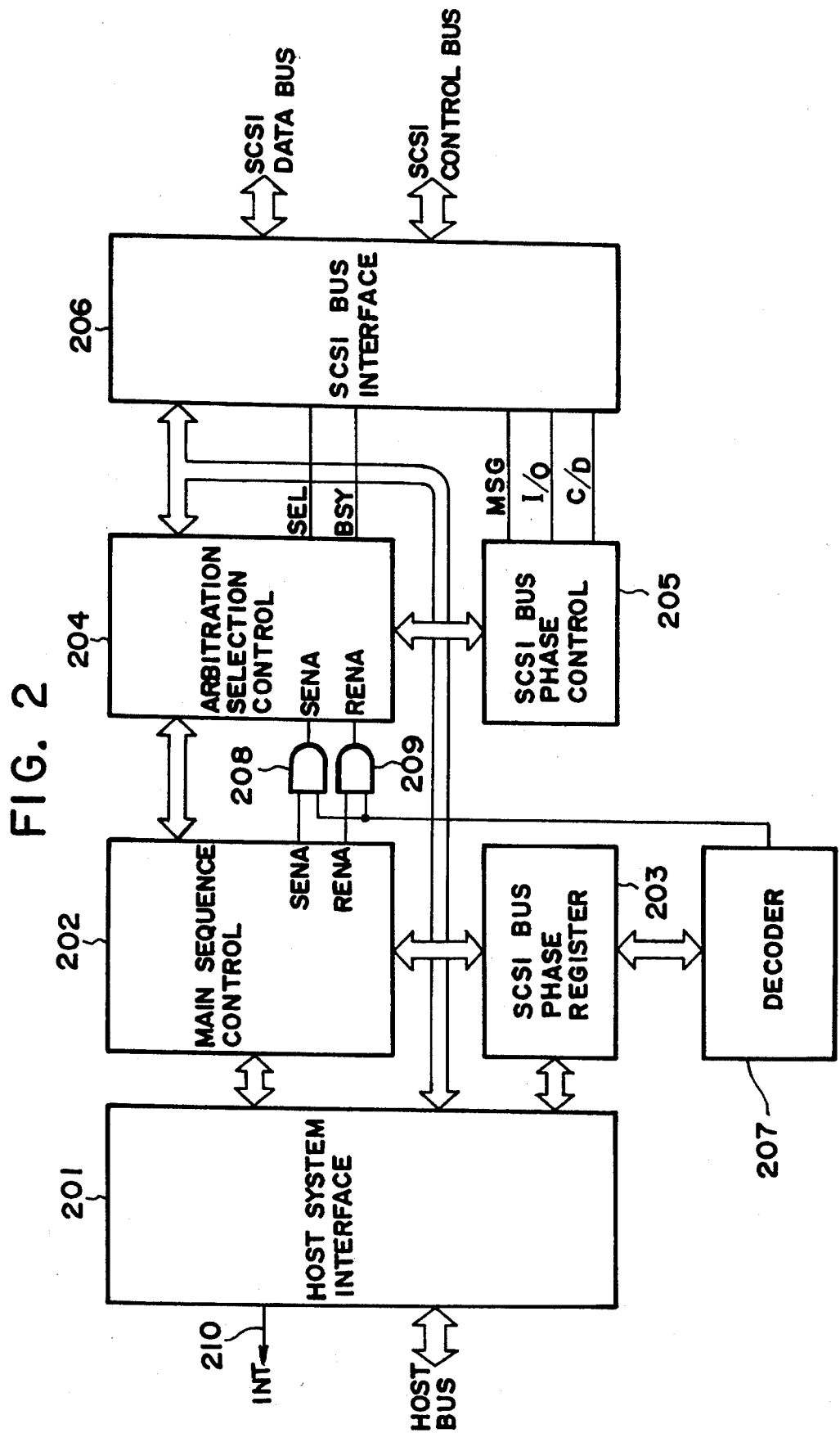
FIG. 2 is a block diagram of an SCSI controller of a first embodiment according to the present invention.

FIG. 2 shows in block form the internal arrangement of an SCSI controller according to a first embodiment of the present invention. In FIG. 2, reference numeral 201 denotes a host interface incorporating a block for performing a read/write for an internal register in the SCSI controller from a host CPU and an FIFO (first-in first-out) register; 202 a main sequence controller for controlling the entire SCSI controller, incorporating a ROM in which a control program is written and an internal register for setting an operation mode; 203 an SCSI bus phase register for reading the phase on an SCSI control bus to store the phase; 204 an arbitration/selection controller for determining the winning or losing of arbitration on the basis of the SCSI ID outputted on an SCSI data bus during the arbitration/reselection operation and its own ID and recognizing that the SCSI controller at issue has been selected when a selection signal (SEL) and its own ID are outputted on an SCSI bus; 205 an SCSI bus phase controller for reading the SCSI phase on the basis of an MSG signal, an I/O signal and a C/D signal on the SCSI control bus or making an output to determine the phase; 206 an SCSI bus interface for controlling the input/output of the SCSI control bus; 207 a decoder for decoding the phase to detect the status wherein an auto-target-command is performing "selection wait"; 208 and 209 AND gates; and 210 an output terminal for informing the host of the occurrence of an interruption at such time as when the command has ended. An auto-target-command is a command for the SCSI controller to perform a series of processes from the selection phase to the command phase. In the selection phase, the initiator selects the SCSI controller with the SCSI controller baits provided with one command from the microprocessor which controls the SCSI controller.

As shown in FIG. 2, in the SCSI controller according to this first embodiment, the host system interface 201 connected with the host CPU controls the read/write operation for the data FIFO register within the block 201 and also for the internal registers in the main sequence controller 202. The commands for the SCSI controller written from the host CPU is written into the command register in the main sequence controller 202 connected with the host system interface 201 through an internal bus, and decoded there.

Then, if the written command is an auto-target-command, an internal counter within the arbitration/selection controller 204 is actuated so that the arbitration/selection controller 204 monitors for a predetermined period of time the ID of the initiator outputted onto the SCSI data bus through the SCSI bus interface 206 and the ID of the target. The SCSI bus phase register 203, when the SCSI controller is operating as a target, stores the SCSI phase code under the control of the main sequence controller 202, and the MSG signal, the C/D signal and the I/O signal on the SCSI control bus from the SCSI bus interface 206 are controlled through the arbitration/selection controller 204 and the SCSI bus phase is determined accordingly.

The SCSI bus phase code stored in the SCSI bus phase register 203 can be read out by the host CPU through the host system interface 201. The SCSI bus phase code outputted from the phase register 203 is also decoded by the decoder 207. When the code is a selection phase, the decoder 207 outputs "H (high)" to the inputs of the AND gates 208 and 209.

The selection enabling signal (SENA) and the reselection enabling signal (RENA) from the internal register in the main sequence controller 202, i.e., the register for setting the mode in selection/reselection are connected with the AND gates 208 and 209. The SENA signal, in the mode to response when the controller is selected as an initiator, is outputted as "H". The RENA signal, in the mode to respond when the controller is selected as a target, is outputted as "H".

Thus, the inputting of the SENA signal and the RENA signal to the arbitration/selection controller 204 occurs when the output from the decoder 207 is "H" and the output SENA and RENA signals from the main sequence controller 202 are also "H". If the SENA signal is "H", the controller can respond when it is selected as a target, and if the RENA signal is "H", the same can respond when it is selected as an initiator.

Thus, the SCSI controller to be a target will not respond before the auto-target-command is issued, and when it is selected after the auto-target-command is issued, it will respond as a target. The auto-target-command can be used without its issuing timing taken into consideration.

Assuming that in a system composed of a CPU having a minimum instruction cycle of 200 ns and an SCSI controller supporting the high speed synchronous transfer rate of 10

MB/s, read for I/O access includes 14 cycles and write therefor includes 10 cycles, the overhead time of 52.0 μs due to only the I/O access can be reduced. Specifically, in the high speed synchronous transfer rate of 10 MB/s, the time taken for one sector to transfer the 1024 byte data of the magnetic disk (floppy disk) to the initiator is 124.0 μs, so that the overhead time due to only the I/O access occupies 40% or more of the transfer time. But, according to this embodiment, the auto-target-command can be used so that the processing can be completed by three times of I/O access. Thus, the overhead time $T_o$ due to only the I/O access can be represented by:

$$T_O=(15 \times \text{twice}+10 \times \text{once}) \times 200 \text{ ns}=8.0 \text{ μs}.$$

It can be reduced to 7% or less of that in the prior art.

Figure 3:
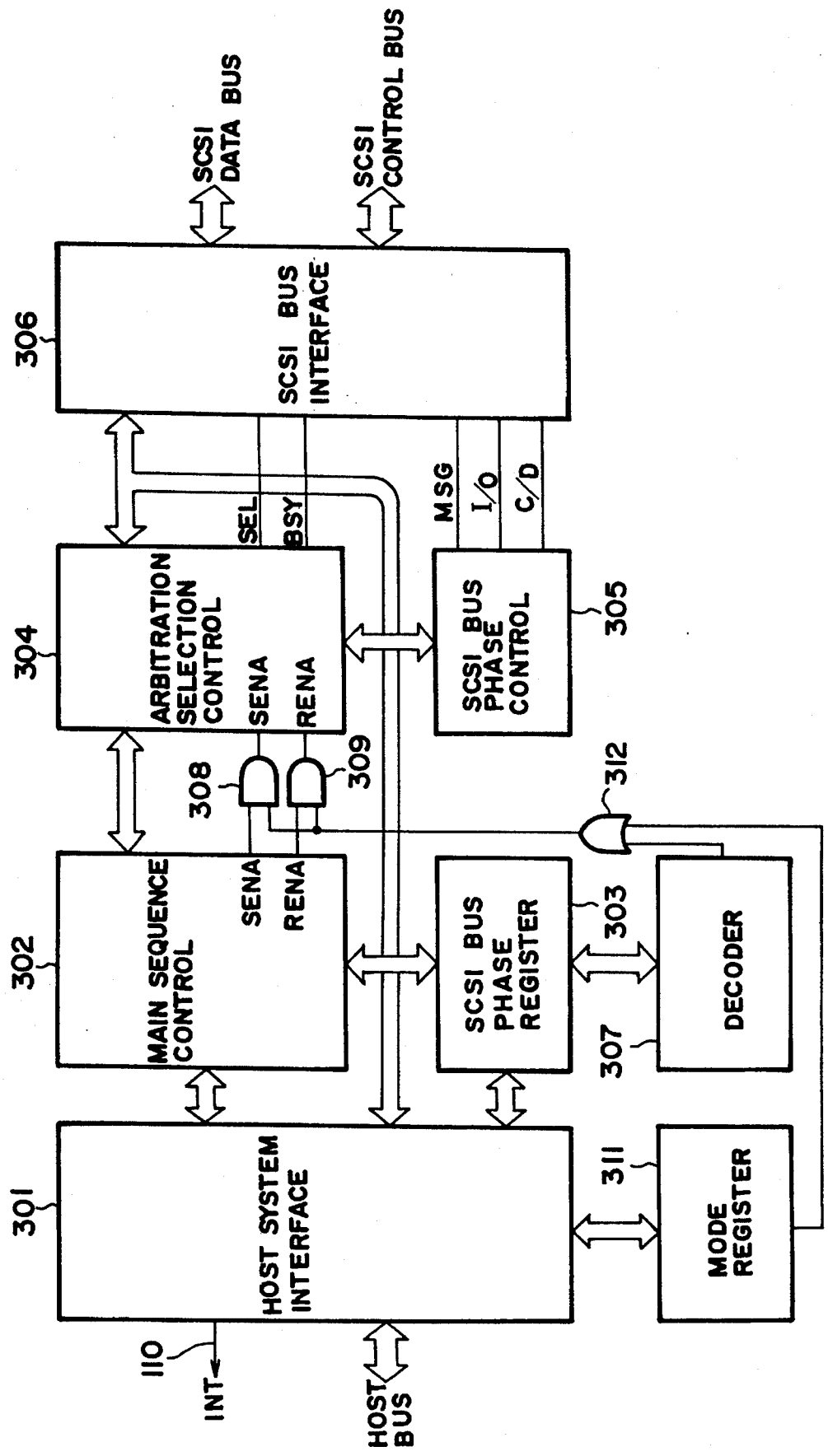
FIG. 3 is a block diagram of an SCSI controller of a second embodiment according to the present invention.

FIG. 3 shows in block form the internal arrangement of an SCSI controller according to a second embodiment of the present invention. In FIG. 3, reference numeral 301 denotes a host interface incorporating a block for performing a read/write for the internal registers in the SCSI controller from a host CPU and an FIFO (first-in first-out) register; 302 a main sequence controller for controlling the entire SCSI controller, incorporating a ROM in which a control program has written in advance and an internal register for setting an operation mode; 303 an SCSI bus phase register for reading the phase on an SCSI control bus to store the phase; 304 an arbitration/selection controller for making a decision on arbitration on the basis of the SCSI ID outputted on the SCSI data bus in arbitration/reselection and its own ID and recognizing that the SCSI controller at issue has been selected when a SEL signal and its own ID are outputted on the SCSI bus; 305 an SCSI bus phase controller for reading the SCSI phase on the basis of a MSG signal, an I/O signal and a C/D signal on the SCSI control bus or making an output to determine the phase; 306 an SCSI bus interface for controlling the input/output for the SCSI data bus and the SCSI control bus; 307 a decoder for decoding the phase to detect the status where an auto-target-command is making "selection wait"; 308 and 109 AND gates; 310 an output terminal for informing the host of the occurrence of an interruption at such time as when the command has ended; 311 a mode register for setting the mode of responding to the selection or reselection with RENA and SENA made valid even when an auto-target-command or an auto-initiator-command inclusive of the reselection operation is not detected; and 312 an OR gate.

As shown in FIG. 3, in the SCSI controller according to this second embodiment, the host system interface 301 connected with the host CPU controls the read/write operation for the data FIFO register within the block 301 and also for the internal registers in the main sequence controller 302. The commands for the SCSI controller written from the host CPU is written into the command register in the main sequence controller 302 connected with the host system interface 301 through an internal bus, and decoded there.

Then, if the written command is an auto-target-command, a counter within the arbitration/selection controller 304 is actuated so that the arbitration/selection controller 304 monitors for a predetermined period of time the ID of the initiator outputted onto the SCSI data bus through the SCSI bus interface 306 and the ID of the target.

The phase register 303, when the SCSI controller is operating as a target, stores the SCSI bus phase under the control of the main sequence controller 302 and the arbitration/selection controller 304 controls the MSG signal, the C/D signal and the I/O signal on the SCSI control bus through the SCSI bus interface 306 and determines the SCSI bus phase.

The SCSI bus phase code stored in the SCSI bus phase register 303 can be read out by the host CPU through the host system interface 301. The SCSI bus phase code outputted from the SCSI bets phase register 303 is also decoded by the decoder 307. When the code is a "selection phase", the decoder 307 outputs "H (high)" to the inputs of the AND gates 308 and 309. The selection enabling signal (SENA) and the reselection enabling signal (RENA) from the internal register in the main sequence controller 302, i.e., the register for setting the mode in selection/reselection are connected with the AND gates 308 and 309, respectively.

The SENA signal, in the mode to respond when the SCSI controller is selected as an initiator, is outputted as "H". The RENA signal, in the mode to respond when the same is selected as a target is also outputted as "H".

Thus, the inputs of the SENA signal and the RENA signal to the arbitration/selection 304 occur when the output from the decoder 307 is "H" and also the output SENA and RENA signals from the main sequence controller 302 are "H". If the SENA signal is "H", the SCSI controller can respond when it is selected as a target, and if the RENA signal is "H", the controller can respond when it is selected as an initiator.

Thus, the SCSI controller to be a target will not respond before the auto-target-command is issued, and when it is selected after the auto-target-command is issued, it will respond as a target. The auto-target-command can be used without considering its issuing timing.

Assuming that in a system composed of a CPU having a minimum instruction cycle of 200 ns and an SCSI controller supporting the high speed synchronous transfer rate of 10 MB/s, read for I/O access includes 14 cycles and write therefor includes 10 cycles, the overhead time of 52.0 μs due to only the I/O access can be reduced. Specifically, in the high speed synchronous transfer rate of 10 MB/s, the time taken for one sector to transfer the 1024 byte data of the magnetic disk to the initiator is 124.0 μs, so that the overhead time due to only the I/O access occupies 40% or more of the transfer time. But, according to this embodiment, the auto-target-command can be used so that the processing can be completed by three times of I/O access. Thus, the overhead time $T_o$ due to only the I/O access can be represented by:

$$T_O=(15 \times \text{twice}+10 \times \text{once}) \times 200 \text{ ns}=8.0 \text{ μs}.$$

It can be reduced to 7% or less of that in the prior art.

Further, if the, mode register 311 is set for the mode responding to the selection or reselection even when the auto-target-command is not issued, it outputs "H" to the OR gate 312. Thus, the outputs from the AND gates 308 and 309 become "H", so that the SCSI controller can respond to the selection or reselection. Also, when the decoder 307 does not detect the auto-target-command, the mode of responding to the selection can be established. As a result, it is possible to deal with the case where the command for performing "wait" of the selection/reselection such as the auto-target-command is not used.

As has been described hereinabove, the SCSI controller according to the present invention includes means for automatically storing each SCSI bus phase code which depends on the status of an SCSI control bus, means for decoding the stored phase code, after an auto-target-command is issued to the SCSI controller to be a target, to detect a selection waiting phase signal and outputting a detection signal, and means for controlling the signal for permitting the response within the SCSI controller to the selection of the SCSI controller as a target by assertion of the BSY signal. For this reason, when an initiator intends to select the SCSI controller as a target, the SCSI controller serving as the target does not assert the BSY signal until it detects the selection phase after the auto-target-command has been issued, so that the auto-target-command of performing wait of detection of the selection phase does not become invalid. The auto-target-command can be used without considering its issuing timing. The overhead time can also be reduced greatly.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. A Small Computer System Interface ("SCSI") controller adapted to perform an auto-target-command defined by an SCSI protocol and for carrying out standard operations in a selection phase, which is an SCSI bus phase when a target capable of responding to a request for performing an operation is selected, and in each of further SCSI bus phases, said SCSI controller comprising:

a phase register means which automatically stores each SCSI bus phase code which is determined by a status of an SCSI control bus in the selection phase;

a decoder means which, after the auto-target-command is issued to the SCSI controller selected as a target, decodes the phase stored by said phase register means to detect a selection waiting phase and outputs a detection signal;

an arbitration/selection control means which controls Function of asserting a busy ("BSY") signal for responding to selection of the SCSI controller as a target; and a signal control means which causes the BSY signal to be asserted when, in the selection phase, the selection of the SCSI controller is detected after the issuance of the auto-target-command which intends to select the SCSI controller as a target.

2. An SCSI controller according to claim 1, in which said signal control means includes AND gates receiving the detection signal from said decoder means.

3. An SCSI controller according to claim 2, in which said signal control means includes a mode register means and an OR gate whose one input terminal receives an output from said decoder means and the other input terminal receives an output of said mode register, means and which sets a mode of said AND gates to permit a response to selection/reselection even when the auto-target-command is not issued.

4. A Small Computer System Interface ("SCSI") controller adapted to perform an auto-target-command defined by an SCSI protocol and for carrying out standard operations in a selection phase, which is an SCSI bus phase when a target capable of responding to a request for performing an operation is selected, and in each of further SCSI bus phases, said SCSI controller comprising:

a phase register which automatically stores each SCSI bus phase code which is determined by a status of an SCSI control bus in the selection phase;

a decoder which, after the auto-target-command is issued to the SCSI controller selected as a target, decodes the phase stored by said phase register to detect a selection waiting phase and outputs a detection signal;

an arbitration/selection controller which controls function of asserting a busy ("BSY") signal for responding to selection of the SCSI controller as a target; and a signal controller which causes the BSY signal to be asserted when, in the selection phase, the selection of the SCSI controller is detected after the issuance of the auto-target-command intends to select the SCSI controller as a target.

5. An SCSI controller according to claim 4, in which said signal controller includes AND gates receiving the detection signal from said decoder.

6. An SCSI controller according to claim 4, in which said signal controller includes a mode register and an OR gate whose one input terminal receives an output from said decoder and the other input terminal receives an output of said mode register and which sets a mode of said AND gates to permit a response to selection/reselection even when the auto-target-command is not issued.

* * * * *